United States Patent [19]

Jeter

[11] Patent Number: 4,777,377
[45] Date of Patent: Oct. 11, 1988

[54] VEHICLE ANTI-THEFT SYSTEM

[76] Inventor: Herman C. Jeter, 7718 S. Bennett, Chicago, Ill. 60649

[21] Appl. No.: 773,437

[22] Filed: Sep. 6, 1985

[51] Int. Cl.$^4$ ............................................ B60R 25/08
[52] U.S. Cl. ................... 307/10 AT; 180/287; 303/89; 340/63
[58] Field of Search ............... 180/287, 271; 70/243; 307/10 AT; 340/63, 64, 65; 303/84 R, 84 A, 89

[56] References Cited

U.S. PATENT DOCUMENTS

| | | | |
|---|---|---|---|
| 3,358,481 | 12/1967 | Roszkowski | 70/243 |
| 3,559,755 | 2/1971 | Pond | 180/287 |
| 3,882,959 | 5/1975 | Hsieh | 180/287 |
| 4,196,939 | 4/1980 | Kavis | 180/287 |
| 4,300,057 | 11/1981 | Crosas | 180/287 |
| 4,366,466 | 12/1982 | Lutz | 180/287 |
| 4,438,752 | 3/1984 | Cheung | 180/287 |
| 4,471,852 | 9/1984 | Schield | 180/287 |
| 4,566,556 | 1/1986 | Wodeslavsky | 180/287 |

Primary Examiner—John J. Love
Assistant Examiner—Everett G. Diederiks, Jr.
Attorney, Agent, or Firm—Leonard J. Kalinowski

[57] ABSTRACT

A vehicle anti-theft system which is activated by a key switch or by a magnetically coded card and associated car reader to activate a latching solenoid valve to one state for disabling functions of the vehicle, preventing operation of the vehicle, or to the opposite state for enabling operation of the vehicle. The system requires a specified voltage at a level higher than the voltage of the vehicle battery to prevent compromising of the system as by the use of jumper cables or the like.

5 Claims, 3 Drawing Sheets

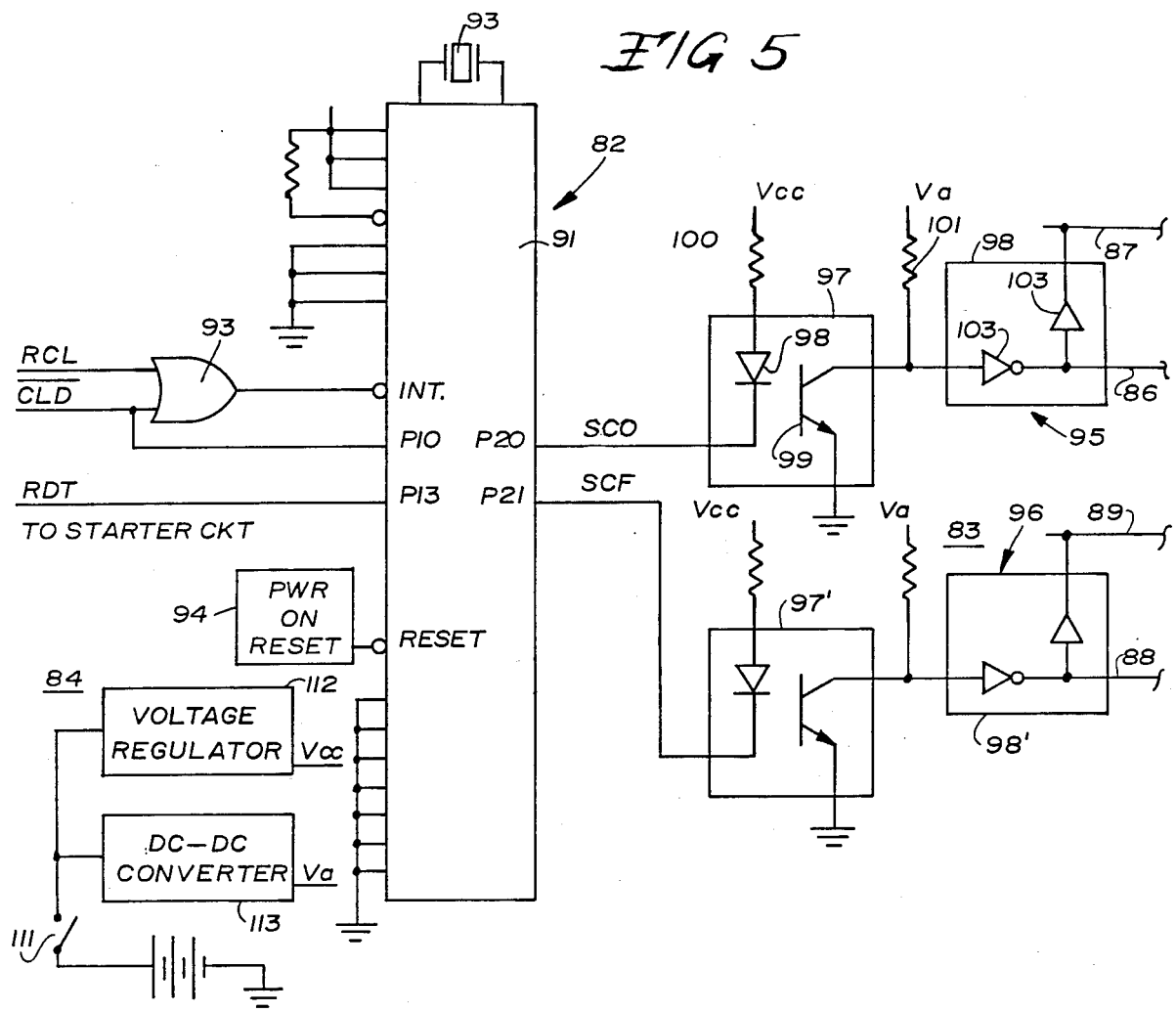
FIG 5
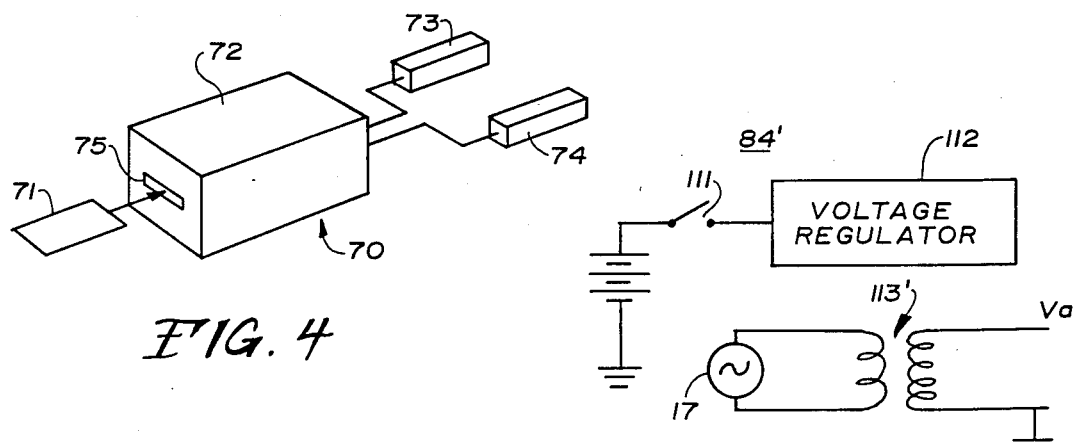
FIG. 4
FIG. 6

VEHICLE ANTI-THEFT SYSTEM

BACKGROUND OF THE INVENTION

This invention relates to vehicle anti-theft systems, and more particularly to such systems in which a latching device is activated electronically to temporarily disable a function of the vehicle, preventing operation of the vehicle.

Various vehicle anti-theft arrangements have been proposed in the prior art, the most common of which include ignition locks, steering wheel locks, and alarm devices which provide audible and/or visible alarm indications. It is well known that systems of these types are easily compromised, and thus, sophisticated control systems have been proposed. Such systems generally include electronically activated control devices which disable the vehicle as by locking wheel movement or shutting off the vehicle exhaust or fuel line systems. The more sophisticated systems employ input devices which respond only to specifically coded signals to activate and deactivate the system.

For example, in U.S. Pat. No. 4,300,057 granted to Pedro Batlle Crosas, there is disclosed an anti-theft apparatus for vehicles in which a valve in a hydraulic return circuit of the braking system is activated by an electronic circuit set off by specific voltages acting as an electronic code. The use of such code input prevents deactivating the system by jumping from the vehicle battery. Although the locking means is activated and deactivated by using the electrical power source of the vehicle, maintenance of the wheels in a locked or unlocked condition is not directly related to the power source because the control valve includes a dual effect coil having two windings which can be switched state only by specific voltages which make up an electronic code which controls the switching of the valve.

Another automobile anti-theft system is disclosed in U.S. Pat. No. 3,358,481 issued to Gregory J. Roszkowski. In this system, a valve in the fuel line is operated by a source of energy having a different characteristic from the energy available in the vehicle. A converter can be energized only by means of special key which incorporates part of the converter circuit. This converter prevents a thief from defeating the purpose of the system by using a jumper cable to connect the available power source directly to protection device itself.

SUMMARY OF THE INVENTION

The present invention provides a vehicle anti-theft system which includes an actuating means which electronically activates a latching device of the system to temporarily disable a function of the vehicle, preventing operation of the vehicle.

In accordance with the invention, the vehicle anti-theft system comprises activating means for connecting an energizing signal to a bisable device which is connected to control an operating system of the vehicle with which it is used, to prevent operation of the vehicle when desired. In particular, the bistable device is a latching solenoid valve assembly which is connected to the hydraulic brake system. In an off condition, the valve is latched in one state and the brake system operates in a normal manner. When operated to an on condition, the valve is latched in its other state and prevents release of the brakes, once the brakes are set, thereby preventing the vehicle from being driven. The activating means comprises a key-switch which can be operated to at least two positions to connect the energizing signal selectively to either one of two operate windings of the latching valve.

Further in accordance with the invention, the system comprises a magnetically coded card bearing a security code, a card reader, processor means, and bistable actuating means for controlling the operation of the controllable device. The card reader reads the card and provides data signals coded to represent the security code which are applied to the processor means. The processor means responds to the interrupts generated by the card reader to receive the coded data signals and to compare the coded data signals with stored data signals and to compare the coded data signals with stored data signals representing the security code. When the received data signals correspond to the stored data signals, the processor generates at least one control output for causing the actuating means to switch state and thereby operate the controllable device to prevent operation of the vehicle.

The system requires a specific voltage to activate latching devices which disable functions necessary to allow the vehicle to operate. A voltage different from that provided by automotive electrical system is employed in operating the solenoids so that the system cannot be compromised through the use of electrical bypasses around elements of the anti-theft system.

DESCRIPTION OF THE DRAWINGS

FIG. 4 is a perspective view of a control module and a code card of the vehicle anti-theft system of FIG. 3;

FIG. 5 is a schematic circuit and partial block diagram of the electrical circuits of the vehicle anti-theft system shown in FIG. 4; and FIG. 6 illustrates an alternative power supply circuit for the electrical circuits of FIG. 5.

DESCRIPTION OF PREFERRED EMBODIMENTS

Figure 1:
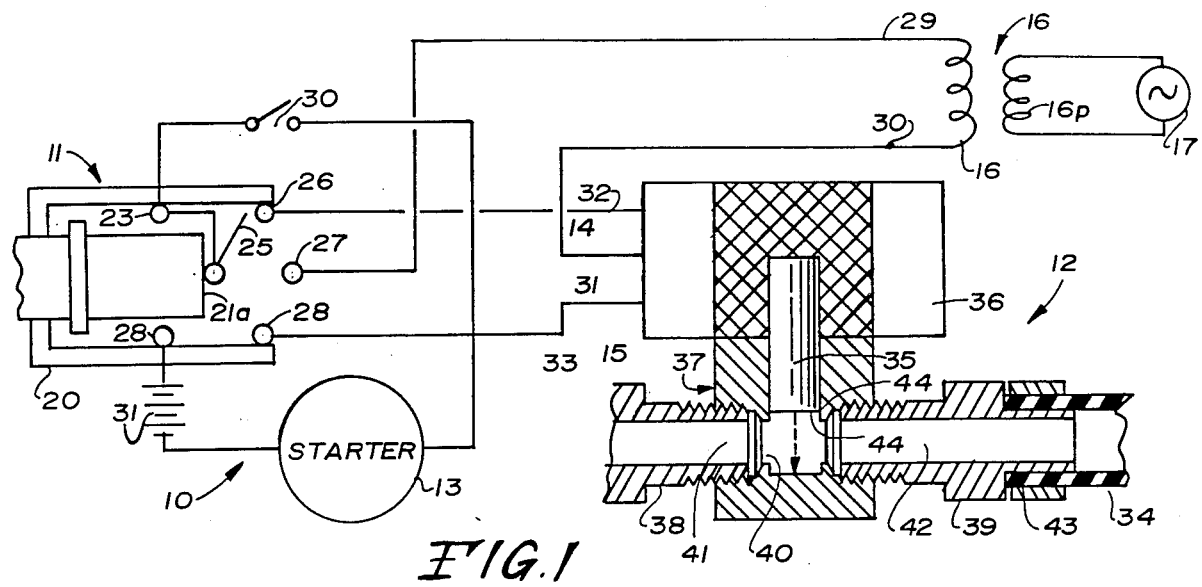
FIG. 1 is a diagrammatic representation of a vehicle anti-theft system provided by the present invention.

Referring to FIG. 1 of the drawings, a vehicle anti-theft system 10 of the present invention includes a key-operated switch 11 which is operated to connect a source of energizing potential to a latching valve solenoid assembly 12 for actuating the valve 12 to temporarily disable an operating function of the vehicle. The valve 12 may be suitably connected to control the hydraulic brake system to lock wheel movement, or to control fuel line shut off and the like so as to disable the vehicle with which it is used.

In accordance with one aspect of the invention, the key-operated switch 11 is a four position switch which is operable to complete the ignition circuit to the starter 13 of the vehicle and to apply an energizing signal to the latching valve 12. Latching valve 12 has a two section coil including windings 14 and 15, key switch 11 allowing selective energization of the two windings 14 and 15 of the valve 12. The key switch 11 also has an "off"

position in which the vehicle ignition circuit is interrupted and both coil circuits of the valve 12 are interrupted. A two position key switch could be used in applications where locking of the ignition circuit is not desired.

In accordance with another aspect of the invention, the windings 14 and 15 of the valve 12 are energized by a signal having a characteristic different from that supplied by the vehicle battery. For example, a voltage at a 24 volt level or a 48 volt level may be used, such voltage being obtained through the use of a step-up transformer 16 connected between the output of the vehicle alternator 17 and the valve windings 14 and 15.

Considering the vehicle anti-theft system 10 in more detail, the switch 11, shown diagrammatically, incudes a switch housing 20, a switch cylinder 21, a ring contactor 22, a pair of contacts 23 and 24, a pole 25 and a set of contacts 26, 27, and 28.

The switch cylinder 21, which is key-operated, is slidably mounted within housing 20 and is normally locked in the switch "off" position as illustrated in FIG. 1. The switch cylinder is movable, when unlocked, towards the right, in FIG. 1, to move the ring contactor 22 into engagement with contacts 23 and 24, completing a circuit between these contacts. The pole 25 which is carried by the end 21a of the switch cylinder 21 is moved into the proximity of the set of contacts 26-28, and in a normal position engages common contact 27 only. The key switch is rotatable clockwise from the normal position to move the pole 25 into bridging contact with contacts 26 and 27, completing a circuit therebetween, or counterclockwise from the normal position to move the pole 25 into bridging contact with contacts 27 and 28, completing a circuit therebetween.

Contacts 23 and 24 of the switch 11 are connected in the starter circuit which includes the ignition switch 30, the vehicle battery 31 and the starter 13. Thus, the starter cannot be operated unless the switch 81 is operated and a circuit path is completed between contacts 23 and 24.

Contacts 26-28 are connected in the energizing circuit for the two windings 14 and 15 of the valve 12 which circuit includes the secondary winding 16s of the step-up transformer 16 which has its primary winding 16p connected across the output of the vehicle alternator 17. One terminal 29 of winding 16s is connected to contact 27 and the other terminal 30 of winding 16s is connected to the common terminal 31 of windings 14 and 15 which have respective terminals 32 and 33 connected to contacts 26 and 28 respectively. Thus, when pole 25 is operated to complete a circuit between contacts 26 and 27, winding 14 is energized, operating the valve 12 to one state, and thereafter when pole 25 is operated to complete a circuit between contacts 27 and 28, winding 15 is energized operating the valve 12 to its opposite state.

Figure 2:
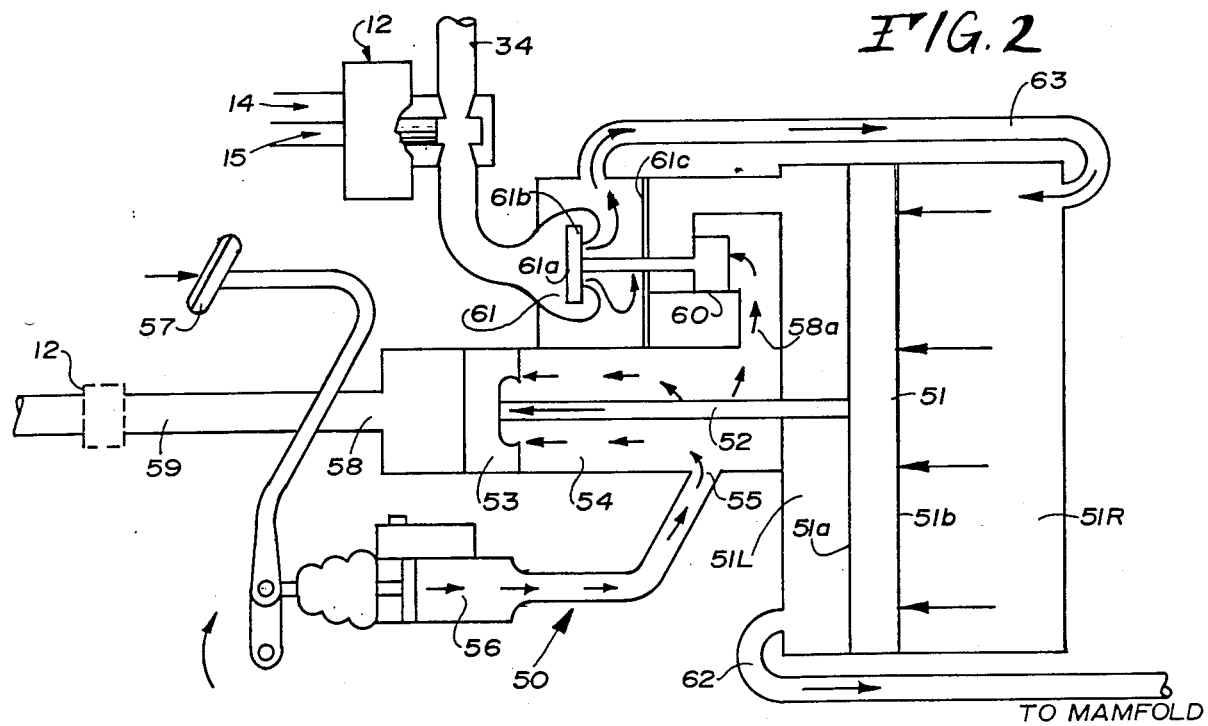
FIG. 2 is a diagrammatic representation of a vacuum power assist brake system which is controlled by the vehicle anti-theft system shown in FIG. 1.

In an actual embodiment, latching solenoid valve assembly 12 was connected in series with the air intake/outlet line 34 of a vehicle power assisted braking system as illustrated in FIG. 2. In such arrangement, the wheels of the vehicle are locked by holding pressure on the wheel cylinders which in turn hold the brake shoes or brake discs in locked position against the wheels or brake drums. It is apparent, that the latching valve assembly may be connected in series with the brake line at the outlet of the master brake cylinder (the valve assembly being represented by dashed line 12) or could be connected in series with the manifold.

The latching valve solenoid assembly 12, which in an actual embodiment was the Magnalatch valve commercially available from Honeywell, includes a two section coil having windings 14 and 15, a plunger 35, and a permanent magnet 36 all contained within a valve housing 37. A pair of brass fittings 38 and 39 adapt the latching valve solenoid assembly 12 to the air lines to which it is connected. The housing 37 which is generally cylindrical in shape, has a transverse bore 40 defining a fluid inlet 41 for the valve and a fluid outlet 42 for the valve. The inner surfaces of the bore 40 at the valve inlet 41 and the valve outlet 42 are threaded to receive the threaded ends of the brass fittings 38 and 39 which are received therein in sealing relationship to prevent in the loss of air. The outer edge of the fittings, such as edge 43 for fitting 39 defines a mounting shoulder for receiving the end of the line 34 which is clamped there to in a suitable manner.

The valve housing 37 further includes an axial bore 44 in which is located the plunger 35 for reciprocating movement therewithin. The bottom end of the axial bore 44 communicates with the transverse bore 40. The plunger 35 is illustrated in its retracted position in which communication is provided between the inlet 41 and the outlet 42 of the valve enabling fluid to flow therethrough. In the extended position, plunger 35 is driven downward to be located intermediate the ends of the fittings 38 and 39 to interrupt the flow of fluid through the line 34.

The plunger 35 is operated from its retracted position to its extended position in response to application of a pulsating DC voltage at 24 volts to winding 14. Once activated, the plunger 35 will remain in its extended position, blocking fluid flow through the valve even when the energizing signal is removed from winding 14. To retract plunger 35, drawing it upward to resume fluid flow through the valve, winding 15 is energized at a 24 volt level. Once restored to its retracted position, plunger 35 remains in its retracted position until winding 14 is energized at a 24 volt level.

Referring to FIG. 2, the latching solenoid valve assembly 12 is shown connected in series with the air intake/outlet line 34 of a vehicle power assist braking system 50. The braking system which is illustrated diagrammatically is a commercially available system and is an example of one manner in which the vehicle anti-theft system of the present invention may be employed.

Briefly, operation of the power brake assist system is based upon the use of a vacuum obtained from the manifold of the engine and a pressure, i.e. atmospheric pressure, to create a pressure differential across a piston which is connected to the piston in the brake cylinder, assisting in driving the piston toward "brake-applying" position when the brake pedal is depressed.

Referring to FIG. 2, the power assist braking system 50 includes a piston 51 connected via rod 52 to a piston 53 in a slave cylinder 54 which communicates at its inlet 55 with the master cylinder 56 which is mechanically coupled to the brake pedal 57. The slave cylinder 54 communicates at one outlet 58 with the brake line 59 and at a second outlet 58a with a piston 60 of a valve 61.

A vacuum is created in a chamber 51L at one side 51a of the piston 51 by way of a connection 62 to the manifold of the engine. A chamber 51R at the other side 51b of the piston 51 is coupled through intake/outlet pipe 63, valve 61 and latching solenoid valve assembly 12 to the air intake/outlet 34. Valve 61 is normally closed, with its valve head 61a engaging valve seat 61b, maintaining the air intake/outlet out of communication with piston 51. Valve 61 is operated in response to the vehicle operator depressing the brake pedal 57 which causes brake fluid under pressure to be applied to piston 60 driving valve 61 open. When valve 61 is open, air at atmospheric pressure is applied to side 51b of the piston 51, driving the piston 51 toward the left in FIG. 2 since a vacuum is maintained in chamber 51L at side 51a of the piston 51. A diaphragm 61c separates the chamber 51L from atmospheric pressure inlet at valve seat 61b.

Operation

With reference to FIGS. 1 and 2, by way of illustrating the operation of the vehicle anti-theft system 10, when used to disable the vehicle power brake system, it is assumed that the key switch 11 is operated to its "on" position completing the ignition circuit and that the engine is running. Also, pole 25 is assumed to be in its normal position. To operate the latching solenoid valve assembly 12 of the anti-theft system 10, the motor vehicle operator first depresses the brake pedal 57 causing brake fluid to flow from the master cylinder 56 to the slave cylinder 54, opening valve 61 to admit air at atmospheric pressure to side 51b of piston 51, the other side 51a of which is maintained at a vacuum. This causes piston 51 to be driven towards the left in FIG. 2, assisting the hydraulic fluid pressure in driving the piston 53 toward the left increasing hydraulic fluid pressure in brake line 59 to operate the brakes of the vehicle.

Then the operator rotates switch cylinder 21 clockwise from its normal position, applying pulsating DC at a 24 volt level from alternator 17 to winding 14 of the latching solenoid valve assembly 12 driving its plunger 35 to its extended position, closing off the air intake/outlet line 34. Accordingly, when the brake pedal 57 is released, air at atmospheric pressure is trapped in chamber 51R and piston 51 cannot restore when the brake pedal 57 is released, and the vehicle brakes are thus "locked on". The operator then merely shuts off the ignition and operates the key switch 11 to its "switch-off" position which further locks the starter circuit, disabling the vehicle.

To enable the vehicle, the key switch 11 must be operated to its "switch-on" position and the engine must be started to obtain alternator power. Then the switch cylinder 21 must then be rotated counterclockwise to energize winding 15 to cause the valve plunger 35 to retract and communicate chamber 51R with atmosphere to allow piston 51 to retract to its normal position, allowing brake cylinder piston 53 to retract, releasing the vehicle brakes.

Figure 3:
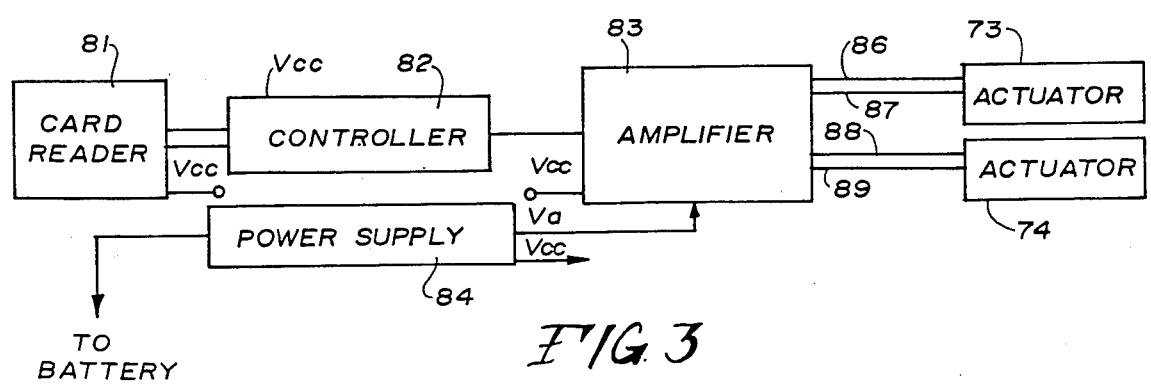
FIG. 3 is a block diagram of another embodiment of a vehicle anti-theft system provided by the present invention employs a card reader.

Referring to FIGS. 3 and 4 of the drawings, in accordance with a further embodiment, a vehicle anti-theft system of the present invention comprises a magnetic card-operated system 70 which controls latching solenoids to temporarily disable operating functions of the vehicle. A code card 71 provides input control data to electronic circuits 76 of the system 10, shown in block diagram in FIG. 3, which are housed within a suitable housing 72. The electronic circuits 76 respond to the control data to provide control signals for operating one or more latching actuators, such as actuators 73 and 74. The latching actuators operate apparatus for locking wheel movement, fuel line shutoff and the like so as to disable the vehicle with which is it used. For example, actuators 73 and 74 may control the energization of windings 14 and 15 of a latching solenoid valve assembly 12 such as that described above for disabling a power brake system of the vehicle.

Referring to FIG. 3, the electronic circuits 76 of the vehicle anti-theft system 70 include a card reader 81, a controller 82, an amplifier circuit 83 and a power supply circuit 84 which control the operation of latching actuators 73 and 74. The card reader 81 receives the data card 71 through a slot 75 in the front end of the housing 72, detects the coded data stored in the card corresponding to a ten digit code and provides corresponding coded signals to the controller 82. The controller 82 responsively compares the received coded data with a stored ten digit identification code, and if the received ten digit code is identical with the stored code, the controller 82 provides signals through the amplifier circuit 83 to the latching actuators 73 and 74 for switching the state of the actuators to activate the system if it is presently deactivated or to deactivate the system if it is presently activated.

The system 70 is energized by the vehicle battery, and the power supply circuit 84 derives therefrom a regulated DC level Vcc for energizing the electronic circuits 76 of the system 70, including the card reader 81, the controller 82, and the amplifier circuit 83. The amplifier circuit 83 is, in effect, a level shifting circuit which responds to DC logic level signal outputs of the controller 82 to extend an energizing voltage to the latching actuators 73 and 74. The power supply circuit 84 further generates a DC voltage Va at an amplitude greater than the 12 VDC provided by the vehicle battery for application to the latching actuators 73 and 74 via amplifier circuit 83. By way of example, the voltage Va may be at a level of 24 VDC. Thus, when amplifier circuit 83 is activated to apply at level Va to a first pair of output leads, such as the leads 86 and 87, this voltage switches the latching actuator 73 operating valve 12 to one state. The valve 12 will not switch state when a voltage at 12 VDC alone is applied. Since a different voltage is required for operating either of the latching actuators to operate valve 12 between states, the system cannot be compromised by connecting a jumper conductor between the battery and the input terminals of the latching actuators 73 and 74.

Considering the electronic circuits 76 in more detail, by way of example, the card reader 81 may be the Panasonic type Z0-1852-ENA. The data card may provide a ten character code word which is factory coded in a manner known in the art. When the card is inserted, the card reader provides a first output CLD indicating that a card has been inserted. When the characters have been read, the card reader provides an output RCL over one output line and the data representing the characters read over another line RDT.

Referring now to FIG. 5, the controller 82 is a microprocessor based controller including a microprocessor 91 operating under program control to receive and process data read from the data card 71. The microprocessor 91, which may the Intel type 8749, receives the data read from the magnetic card 71 by the card reader 81 via input line RDT which is connected to an input port P13 of the microprocessor 91. Further outputs of the card reader 81 include CLD which indicates a card has been loaded in the card reader and over input RCL which indicates that the card has been read and that serial data is present on line RDT. The inputs CLD and RCL are extended through an OR gate 93 to the interrupt input of the microprocessor 91. Input CLD is also extended to a further input port P10 of the microprocessor 91 to enable the input to be temporarily stored in memory.

The microprocessor includes an internal stored program in ROM and further includes temporary memory or RAM for storing incoming data received at input ports P10 and P13. Timing for the microprocessor is derived from an external crystal 93. A power on reset circuit 94 responds to turning on of the ignition key to apply a reset signal via RESET input of the microprocessor 91 to initialize itself whenever the anti-theft system is actuated.

The microprocessor 91 stores in its memory a ten digit coded word corresponding to the code assigned to the system 70 and compares the incoming ten digit code word with the stored code word. When the received code word matches the stored code word, the microprocessor 91 provides an enabling signal SCO via output port P20 or SCF via output port P21 for activating the latching solenoid windings 14 or 15, respectively.

Figure 7:
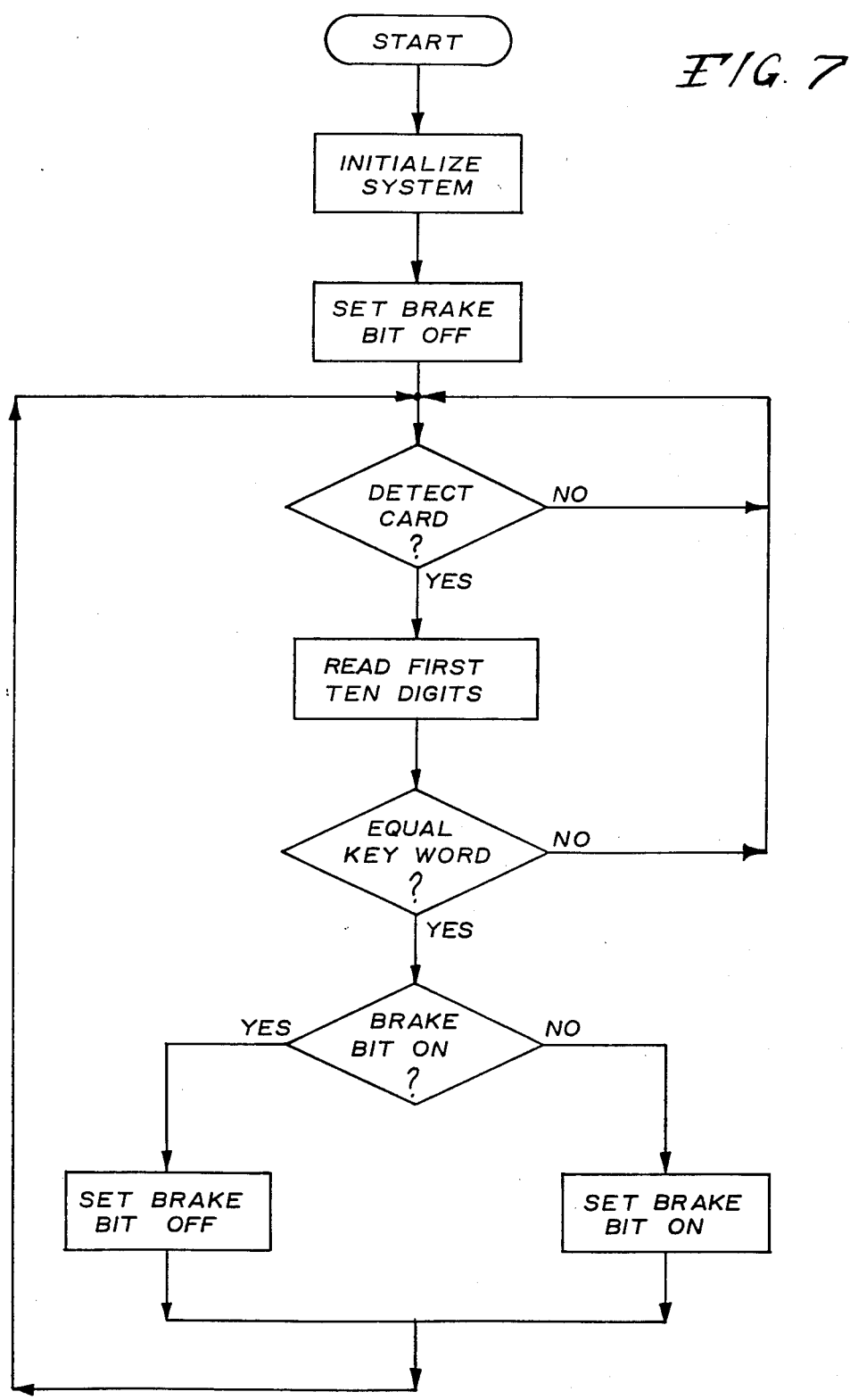
FIG. 7 is a process flow chart describing the operation of the system controller.

Referring to FIG. 7, there is illustrated the program flow chart for the operating program for the microprocessor 91.

When power is first applied to the system, the system initializes itself, clearing registers, etc. and sets the brake bit to the off state. In response to this operation, output SCF will be set high long enough to enable winding 15 to be energized to unlatch valve 12 should it be latched at this time.

Once energized, the system will set in a loop waiting for a data card 71 to be inserted into the card reader 81. After a data card is detected, an attempt is made to read the first ten digits. If the read operation was successful and the keyword compares with the stored code word, the brake bit will be set on by setting high output SCO to energize winding 14 of the valve 12. The program then loops back and waits for subsequent reinsertion and detection of a data card. When a card is subsequently detected and the key word compares with the stored code word, the brake bit will be set to the "off" state, enabling the valve 12 to be unlatched.

The output signals SCO and SCF provided by the microprocessor 91 are extended to the amplifier circuit 83. The amplifier circuit 83 includes activating branch 95 and deactivating branch 96. Each branch, such as branch 95 includes an opto-isolator stage 97 and an output stage 98. The opto-isolator stage 97 converts or transfers the logic DC voltage level from the microprocessor 91 to the voltage level Va at 24 VDC. In an actual embodiment, the opto-isolator was the General Instrument type CNY 65 Opto-Isolator. The opto-isolator, which operates at voltage level Vcc, includes a light emitting diode 98 and a phototransistor 99. The anode of the light emitting diode 98 is connected through a resistor 100 to voltage Vcc and the cathode of the diode is connected to output line SCO of the microprocessor 91. Phototransistor 99 is connected through resistor 101 to the voltage Va and the emitter of transistor 99 is connected to ground (or the negative battery terminal). In an actual embodiment, the output stage was a type 2086 driver circuit. The driver circuit includes an inverter 102 and an isolation diode 103. The input of inverter 102 is connected to the collector of phototransistor 99 and drives output line 86 which is connected to latching solenoid winding 14 and through diode 103 to drives output line 87 which is connected to a further solenoid (not shown).

The other branch 96 of the amplifier circuit 83 similarly includes opto-isolator 97' and output drive circuit 98' which drive output lines 88 and 89 for energizing solenoid winding 15 and a further winding (not shown), respectively. The outputs of the amplifier circuit branches 95 and 96 are normally held at a ground potential. When the microprocessor 91 provides output SCO, indicating that the system is to be activated, a pulse is provided on line SCO which enables opto-isolator 97 which grounds the input to output driver circuit 98 causing it to produce a DC level at 24 VDC on conductors 86 and 87. When microprocessor 91 provides output SCF, indicating that the system is to be turned off, opto-isolator 97' is activated for the duration of the pulse and output drive circuit 98' provides a voltage at 24 VDC on output conductors 88 and 89. In both cases, the length of the output pulse provided by the microprocessor 91 is selected to provide sufficient time for the solenoid windings 14 or 15 to operate the valve 12 from its deactivated to activated state or viceversa.

The power supply circuit 84 is connected to vehicle battery through contacts 111 of the ignition circuit of the vehicle. The power supply circuit 84 includes a suitable voltage regulator circuit 112, such as the type TL 497 regulator chip, which derives a regulated voltage Vcc for the electronic circuits 76 of the system 70. In addition, the power supply circuit 84 includes a DC—DC converter 113 which derives an unregulated voltage Va at 24 volts DC.

Referring to FIG. 6, while in the embodiment just described, a power circuit 84 includes a DC to DC converter 113 to obtain an energizing voltage at 24 VDC, it is apparent that as transformer 16 could be used to derive pulsating DC voltage at a 24 volt level from the vehicle alternator, suitable for driving a latching valve 12. Also, an ignition key switch arrangement could be used in combination with the card reader system illustrated in FIGS. 3-5.

Considering the operation of the vehicle anti-theft system 70, it is assumed initially that the system is activated such that the latching valve solenoid assembly 12 is causing the brakes to lock all four wheels of the vehicle.

When the ignition key is turned on, switch 111 (FIG. 5) is closed, connecting battery to the power supply circuits 84. Also, power on reset signal is supplied to the microprocessor 91 via its reset input, for resetting the microprocessor for initializing it. Also, DC voltage at level Vcc is applied to the electronic circuits 76 and to the card reader 81.

Referring to FIG. 4, when a data card 71 is inserted into card reader 81 through slot 75 of the housing 12, the card reader outputs signal CLD (FIG. 5) to the interrupt input of the microprocessor 91 and to its input port P10. The card reader 81 then reads the data card and outputs a serial pulse train over data line RDT to input port P13 of the microprocessor 91, the microprocessor sampling its input port P13 to read in the data bits and store the data word in RAM.

After all of the bits representing the ten digit security code have been received and stored, the microprocessor compares the received data with the stored code word and if a match is determined, the microprocessor 91 outputs a pulse on line SCF, enabling amplifier branch 96 to output 24 volts DC on output conductors 87 (and 88) for operating solenoid 14 to its deactivated state. This causes valve 12 to be deenergized establishing fluid flow through the brake system from the slave cylinder to the master cylinder to release the brakes and allow the vehicle can be driven.

A similar sequence of events is followed to activate the system when the vehicle is subsequently parked. To activate the system, assuming the ignition key is turned on so that the system 70 is energized, the operator depresses the brake peddle, manually activating the brake cylinders to drive the brake shoes and/or discs into engagement with the brake drums on the wheels. The operator then inserts the card 71 into the card reader 81, and as described above, the microprocessor 91 responds to interrupts generated by the card reader to read the serial data supplied by the card reader, compares the received data with the stored data and outputs a signal on line SCO to activate the solenoid winding 14 to drive the plunger 35 (FIG. 1) from its retracted position to its extended position to block the flow of air through valve 61 preventing the reverse flow of hydraulic fluid through the slave cylinder 54 (FIG. 2) to the master cylinder 56 so that the vehicle brake system is locked on.

I claim:

1. In an anti-theft system for a battery-powdered vehicle having an hydraulic brake system including a master brake cylinder, and a brake line connected to the outlet of the master brake cylinder, the combination comprising: a member bearing magnetically coded data representing a security code, a code reader for receiving said coded member for reading the coded data and to provide a series of data signals representing the coded data; controller means for receiving the series of data signals and comparing the received data signals with stored data signals corresponding to said security code, said controller means providing a control signal whenever the received data signals correspond to the stored data signals, power circuit means for deriving from the vehicle battery for the vehicle a dc signal at an amplitude substantially greater than the amplitude of the signal provided by the battery, a bistable valve means connected in series with said brake line, and actuator means coupled to said controller means and to said power circuit means and responsive to a first occurrence of said control signal and to said dc signal provided by said power circuit means to operate said valve means to a first latching state in which it prevents the flow of brake fluid in the brake line and said actuator means responsive to a second occurrence of said control signal and to said dc signal provided by said power circuit means to operate said valve means to a second latching state in which it enables brake fluid to flow in the brake line.

2. A system according to claim 1, wherein said actuator means comprises first and second latching solenoids each associated with a different controllable device of the vehicle and each being operated to switch state only in response to application thereto of a signal at said second dc level.

3. A system according to claim 1, wherein said controller means includes signal processing means, said signal processing means processing the data signals and providing a control signal whenever the received data signals correspond to the stored data signals, said actuator means including a drive circuit means responding to each control signal and to the dc output signal provided by said power circuit means to switch the state of said valve means.

4. In an anti-theft system for a vehicle having power source means including a battery and an alternator, and said vehicle having a hydraulic brake system including a master brake cylinder and a brake line connected to the outlet of the master brake cylinder, the combination comprising: activating means, power circuit means including a step-up transformer having a primary winding and a secondary winding, said transformer having its primary winding connected to the output of the alternator for providing at its secondary winding a pulsating dc signal at a voltage level greater than the voltage level provided by the battery, and bistable valve means connected in series with the brake line for interrupting the operation of the brake system, said bistable valve means having first and second control inputs, said activating means coupled to said transformer to connect said secondary winding of said transformer selectively to said first and second control inputs of said bistable valve means for operating said bistable valve means between first and second states, respectively, and said bistable valve means when operated to said first state preventing the flow of brake fluid in the brake line, thereby preventing release of the brakes, once set until said bistable valve means is subsequently operated to said second state.

5. In an anti-theft system for a vehicle having power source means including a battery, said vehicle having a hydraulic brake system including a master brake cylinder and a brake line connected to the outlet of the master brake cylinder, the combination comprising: activating means, power circuit means connected to the vehicle battery and including means for providing at the output of the power circuit means a dc signal at a voltage level greater than the voltage level provided by the battery, and bistable valve means connected in series with the brake line for interrupting the operation of the brake system, said bistable valve means having first and second control inputs, said activating means coupled to said power circuit means to connect the output of said power circuit means selectively to said first and second control inputs of said bistable valve means for operating said bistable valve means between first and second latching states, respectively, in response to application of said dc control signal to said first and second control inputs, respectively, and said bistable valve means when operated to said first latching state preventing the flow of brake fluid in the brake line, thereby preventing release of the brakes, once set, until said bistable valve means is subsequently operated to said second latching state.

* * * * *

UNITED STATES PATENT AND TRADEMARK OFFICE
CERTIFICATE OF CORRECTION

PATENT NO. : 4,777,377
DATED : October 11, 1988
INVENTOR(S) : Herman C. Jeter

It is certified that error appears in the above—identified patent and that said Letters Patent is hereby corrected as shown below:

Column 9, line 21, "powdered" should be --powered--.

Signed and Sealed this

Twenty-eighth Day of March, 1989

Attest:

DONALD J. QUIGG

*Attesting Officer*     *Commissioner of Patents and Trademarks*